United States Patent
Kojima et al.

(10) Patent No.: US 9,994,739 B2
(45) Date of Patent: Jun. 12, 2018

(54) POLISHING LIQUID AND METHOD OF POLISHING SIC SUBSTRATE

(71) Applicant: DISCO CORPORATION, Tokyo (JP)

(72) Inventors: Katsuyoshi Kojima, Tokyo (JP); Takeshi Sato, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days. days.

(21) Appl. No.: 14/927,752

(22) Filed: Oct. 30, 2015

(65) Prior Publication Data

US 2016/0130475 A1 May 12, 2016

(30) Foreign Application Priority Data

Nov. 6, 2014 (JP) .................................. 2014-225756

(51) Int. Cl.
*C09G 1/04* (2006.01)
*B24B 37/11* (2012.01)

(52) U.S. Cl.
CPC ................ *C09G 1/04* (2013.01); *B24B 37/11* (2013.01)

(58) Field of Classification Search
None
See application file for complete search history.

(56) References Cited

U.S. PATENT DOCUMENTS

| | | | | |
|---|---|---|---|---|
| 6,332,831 B1* | 12/2001 | Shemo | ...................... | C09G 1/02 106/3 |
| 2003/0139069 A1* | 7/2003 | Block | .................. | C09K 3/1463 438/692 |
| 2008/0153292 A1* | 6/2008 | White | ...................... | C09G 1/02 438/692 |
| 2010/0279506 A1* | 11/2010 | White | ...................... | C09G 1/02 438/693 |
| 2011/0156058 A1* | 6/2011 | Hori | ...................... | B24B 37/042 257/77 |
| 2013/0256700 A1* | 10/2013 | Ishibashi | ................. | H01L 29/32 257/77 |
| 2014/0057438 A1* | 2/2014 | Yoshida | ............ | H01L 21/02024 438/692 |
| 2015/0290760 A1* | 10/2015 | Serikawa | .................. | B24B 1/00 451/41 |
| 2016/0257854 A1* | 9/2016 | Omori | ..................... | B24B 37/00 |

FOREIGN PATENT DOCUMENTS

JP        2008-068390        3/2008

OTHER PUBLICATIONS

Electro-chemical mechanical polishing of Silicon carbide; Journal of Electronic Materials, vol. 33, No. 5, 2004; p. 481-486.*

* cited by examiner

*Primary Examiner* — Shamim Ahmed
(74) *Attorney, Agent, or Firm* — Greer Burns & Crain, Ltd.

(57) ABSTRACT

Provided is a polishing liquid which contains a permanganate, a pH adjustor, and water and which is used for polishing of a SiC substrate. Also provided is a method of polishing a SiC substrate, the method including: a first polishing step of polishing the SiC substrate by use of a first polishing liquid containing a permanganate, inorganic salts having an oxidizing ability, and water; and a second polishing step of performing finishing polishing of the SiC substrate by use of a second polishing liquid containing a permanganate, a pH adjustor, and water after the first polishing step.

17 Claims, 2 Drawing Sheets

POLISHING LIQUID AND METHOD OF POLISHING SIC SUBSTRATE

BACKGROUND OF THE INVENTION

Field of the Invention

The present invention relates to a polishing liquid used for polishing a SiC substrate, and to a method of polishing a SiC substrate by use of the polishing liquid.

Description of the Related Art

In power electronics apparatuses such as inverters, there are incorporated semiconductor devices called power devices which are suitable for control of electric power. Conventional power devices have been produced mainly by using single crystal Si (silicon), and enhancement of their performance has been realized by improvements in device structure.

In recent years, however, the enhancement of device performance through improvements in device structure has been hitting a ceiling. For this reason, an attention has come to be paid to single crystal SiC (silicon carbide) which is advantageous over single crystal Si for realization of power devices with higher withstand voltage and lower loss.

Prior to fabrication of power devices into a substrate composed of single crystal SiC, a surface of the substrate is planarized by chemical mechanical polishing (CMP). In order to enhance polishing efficiency in CMP, there has been developed a polishing technique according to the use of a polishing pad containing abrasive grains and a polishing liquid having an oxidizing ability (see, for example, Japanese Patent Laid-Open No. 2008-68390).

SUMMARY OF THE INVENTION

However, when a single crystal SiC substrate is polished using a polishing liquid having an oxidizing ability as aforementioned, disorder would occur in the crystal lattice of the single crystal SiC, resulting in a large lowering in the power device performance.

Accordingly, it is an object of the present invention to provide a polishing liquid with which disorder in crystal lattice can be restrained and a method of polishing a SiC substrate by use of the polishing liquid.

In accordance with an aspect of the present invention, there is provided a polishing liquid to be used for polishing of a SiC substrate, the polishing liquid containing: a permanganate; a pH adjustor; and water.

In accordance with another aspect of the present invention, there is provided a method of polishing a SiC substrate by supplying a polishing liquid to a polishing pad containing abrasive grains or to a polishing pad not containing abrasive grains and bringing the polishing pad into contact with the SiC substrate, the method including: a first polishing step of polishing the SiC substrate by use of a first polishing liquid containing a permanganate, inorganic salts having an oxidizing ability, and water; and a second polishing step of performing finishing polishing of the SiC substrate by use of a second polishing liquid containing a permanganate, a pH adjustor, and water after the first polishing step.

Preferably, the method of polishing a SiC substrate as above is performed using a polishing apparatus including: a chuck table holding the SiC substrate; the polishing pad; tanks storing the first polishing liquid and the second polishing liquid individually; and supplying means selectively supplying one of the first polishing liquid and the second polishing liquid stored in the tanks, and the first polishing liquid is supplied in the first polishing step, whereas the second polishing liquid is supplied in place of the first polishing liquid in the second polishing step.

Since the polishing liquid according to the present invention contains the permanganate, the pH adjustor, and water, disorder which might occur in crystal lattice when a SiC substrate is polished can be restrained, as compared with the case of using a polishing liquid containing a permanganate, inorganic salts having an oxidizing ability, and water. Besides, in the method of polishing a SiC substrate according to the present invention, the finishing polishing of the SiC substrate is conducted using the polishing liquid containing the permanganate, the pH adjustor, and water after the SiC substrate is polished using the polishing liquid containing the permanganate, the inorganic salts having an oxidizing ability, and water, so that disorder in crystal lattice can be restrained while maintaining a high polishing efficiency.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

When a SiC substrate is polished by use of a polishing liquid having an oxidizing ability, it is possible to enhance polishing efficiency, but disorder in the crystal lattice is generated, leading to a largely lowered performance of power devices obtained. The present inventor made intensive and extensive studies on this phenomenon. As a result of the studies, it was found out that the cause of the disorder in the crystal lattice lies in the inorganic salts contained in the polishing liquid for imparting an oxidizing ability. On the basis of the finding, the present invention has been completed. An embodiment of the present invention will be described below, referring to the attached drawings.

Conventional polishing liquids each have contained, for example, a permanganate, inorganic salts having an oxidizing ability (oxidizing inorganic salts), and water. Here, the permanganate is an oxoacid salt of manganese, represented by potassium permanganate and sodium permanganate. The inorganic salts having an oxidizing ability refer to oxidizing solids (corresponding to category I of hazardous materials under Japanese Fire Service Law), such as chlorinates, sulfates, nitrates, and chromates.

On the other hand, the polishing liquid according to the present embodiment contains a pH adjustor, in place of the inorganic salts having an oxidizing ability which have conventionally been used. Specifically, the polishing liquid in the present embodiment contains a permanganate, a pH adjustor, and water. Here, the pH adjustor refers to a reagent for adjusting pH to the acidic side, such as hydrochloric acid (hydrogen chloride), sulfuric acid, nitric acid, and phosphoric acid. By using such a polishing liquid as just-mentioned, the disorder in crystal lattice which might occur attendant on polishing of a SiC substrate can be restrained.

Now, a method of polishing a SiC substrate by use of the polishing liquid according to the present embodiment will be described below. The method of polishing a SiC substrate according to the present embodiment includes at least a first polishing step and a second polishing step. In the first polishing step, the SiC substrate is polished using a polishing liquid (first polishing liquid) containing a permanganate, inorganic salts having an oxidizing ability, and water. In the second polishing step, the SiC substrate is subjected to finishing polishing conducted using a polishing liquid (second polishing liquid) containing a permanganate, a pH adjustor, and water.

Figure 1:
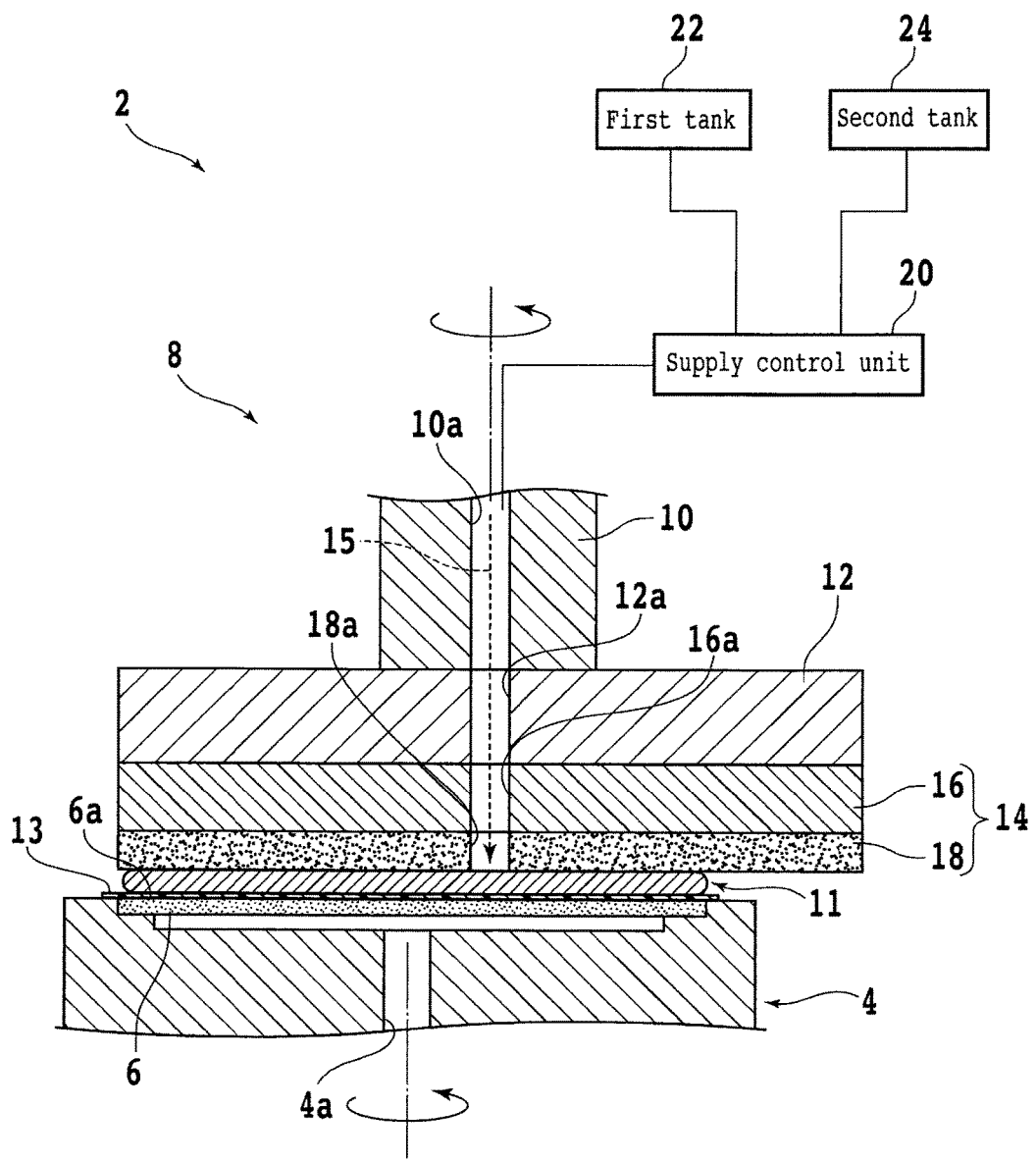
FIG. 1 illustrates schematically a configuration example of a polishing apparatus used in a method of polishing a SiC substrate according to the present invention.

First, a polishing apparatus to be used in the method of polishing a SiC substrate according to the present embodiment will be described. FIG. 1 illustrates schematically a configuration example of the polishing apparatus to be used in the method of polishing a SiC substrate in the present embodiment. As shown in FIG. 1, a polishing apparatus 2 in the present embodiment includes a chuck table 4 for holding a SiC substrate 11 by suction. The chuck table 4 is connected with a rotational drive source (not shown) such as a motor, and is rotated about a rotational axis parallel to the vertical direction. A top surface of the chuck table 4 is formed with a recess, in which is fitted a holding plate 6 formed from a porous material. A top surface of the holding plate 6 constitutes a holding surface 6a on which a disk-shaped SiC substrate 11 composed of single crystal SiC is to be held by suction. A negative pressure of a suction source (not shown) is permitted to act on the holding surface 6a through a passage 4a formed in the inside of the chuck table 4. As depicted in FIG. 1, a film 13 greater than the holding surface 6a in diameter is attached to a lower side of the SiC substrate 11. When the negative pressure of the suction source is permitted to act on the holding surface 6a, with the film 13 in contact with the holding surface 6a, the SiC substrate 11 is held by suction onto the chuck table 4 through the film 13 therebetween.

Above the chuck table 4 is disposed a polishing unit 8 for polishing the SiC substrate 11. The polishing unit 8 includes a spindle 10 constituting a rotary shaft. At a lower end portion (tip portion) of the spindle 10 is provided a disk-shaped wheel mount 12. Onto a lower surface of the wheel mount 12 is mounted a polishing wheel 14 which is substantially equal in diameter to the wheel mount 12. The polishing wheel 14 includes a wheel base 16 formed from a metallic material such as stainless steel or aluminum. Onto a lower surface of the wheel base 16 is fixed a disk-shaped polishing pad 18. The polishing pad 18 is formed, for example, by mixing abrasive grains with such a material as polyurethane. It is to be noted that the polishing pad 18 may not necessarily contain abrasive grains. To an upper end (base end) of the spindle 10 is connected a rotational drive source (not shown) such as a motor. The polishing wheel 14 is rotated about a rotational axis parallel to the vertical direction, by a rotational force transmitted from the rotational drive source.

The spindle 10, the wheel mount 12, the wheel base 16, and the polishing pad 18 are provided therein with longitudinal holes 10a, 12a, 16a, and 18a piercing them in the vertical direction, respectively. A lower end of the longitudinal hole 10a and an upper end of the longitudinal hole 12a are connected to each other, a lower end of the longitudinal hole 12a and an upper end of the longitudinal hole 16a are connected to each other, and a lower end of the longitudinal hole 16a and an upper end of the longitudinal hole 18a are connected to each other. An upper end of the longitudinal hole 10a is connected with a supply control unit (supplying means) 20 through a piping or the like. The supply control unit 20 is further connected with a first tank 22 and a second tank 24 through a piping or the like. In the first tank 22 is stored a polishing liquid which contains a permanganate, inorganic salts having an oxidizing ability, and water. On the other hand, in the second tank 24 is stored a polishing liquid which contains a permanganate, a pH adjustor, and water. The supply control unit 20 supplies one of the polishing liquids stored selectively in the first tank 22 and the second tank 24. A polishing liquid 15 fed from the supply control unit 20 into the longitudinal hole 10a is supplied through an opening of the longitudinal hole 18a formed in the center of the lower surface of the polishing pad 18 to an area of contact between the SiC substrate 11 and the polishing pad 18. While the chuck table 4 and the spindle 10 are kept rotating, the polishing wheel 14 is lowered to bring the lower side of the polishing pad 18 into contact with the upper side of the SiC substrate 11 while supplying the polishing liquid 15, whereby the SiC substrate 11 can be polished.

In the method of polishing a SiC substrate according to the present embodiment, first, the first polishing step is conducted in which the SiC substrate 11 is polished using the polishing liquid containing a permanganate, inorganic salts having an oxidizing ability, and water. Specifically, the SiC substrate 11 is polished under control of the supply control unit 20 such that the polishing liquid (the polishing liquid containing the permanganate, the inorganic salts having an oxidizing ability, and water) stored in the first tank 22 is supplied to the area of contact between the SiC substrate 11 and the polishing pad 18. The first polishing step is finished when the SiC substrate 11 has been polished to reach a preset arbitrary polishing amount. It is to be noted that the polishing liquid used in the first polishing step may contain abrasive grains mixed therein.

After the first polishing step, the second polishing step is performed in which the SiC substrate 11 is subjected to finishing polishing conducted using the polishing liquid which contains a permanganate, a pH adjustor, and water. Specifically, the SiC substrate 11 is polished under control of the supply control unit 20 such that the polishing liquid (the polishing liquid containing the permanganate, the pH adjustor, and water) stored in the second tank 24 is supplied to the area of contact between the SiC substrate 11 and the polishing pad 18. In this way, the polishing liquid to be supplied to the area of contact between the SiC substrate 11 and the polishing pad 18 is changed to be different between the first polishing step and the second polishing step, and, when the SiC substrate 11 has been polished to reach a preset arbitrary polishing amount, the second polishing step is finished. It is to be noted that the polishing liquid used in the second polishing step may contain abrasive grains mixed therein.

In the aforementioned first polishing step, the polishing liquid containing the permanganate, the inorganic salts having an oxidizing ability, and water is used, so that a high polishing efficiency can be maintained. On the other hand, in the second polishing step, the polishing liquid containing the permanganate, the pH adjustor, and water is used, so that disorder which might occur in crystal lattice can be suppressed. It is noted that the polishing amount in the first polishing step and the polishing amount in the second polishing step are preferably regulated so that the efficiency and quality of polishing can be maintained at high levels.

As has been described above, since the polishing liquid in the present embodiment contains the permanganate, the pH adjustor, and water, the disorder which might occur in crystal lattice when the SiC substrate 11 is polished can be restrained, as compared with the polishing liquid containing a permanganate, inorganic salts having an oxidizing ability, and water. In addition, in the method of polishing a SiC substrate according to the present embodiment, the finishing polishing of the SiC substrate 11 by use of the polishing liquid containing the permanganate, the pH adjustor, and water is conducted after the SiC substrate 11 is polished using the polishing liquid containing the permanganate, the inorganic salts having an oxidizing ability, and water, so that disorder in the crystal lattice can be suppressed while maintaining a high polishing efficiency.

Figure 2:
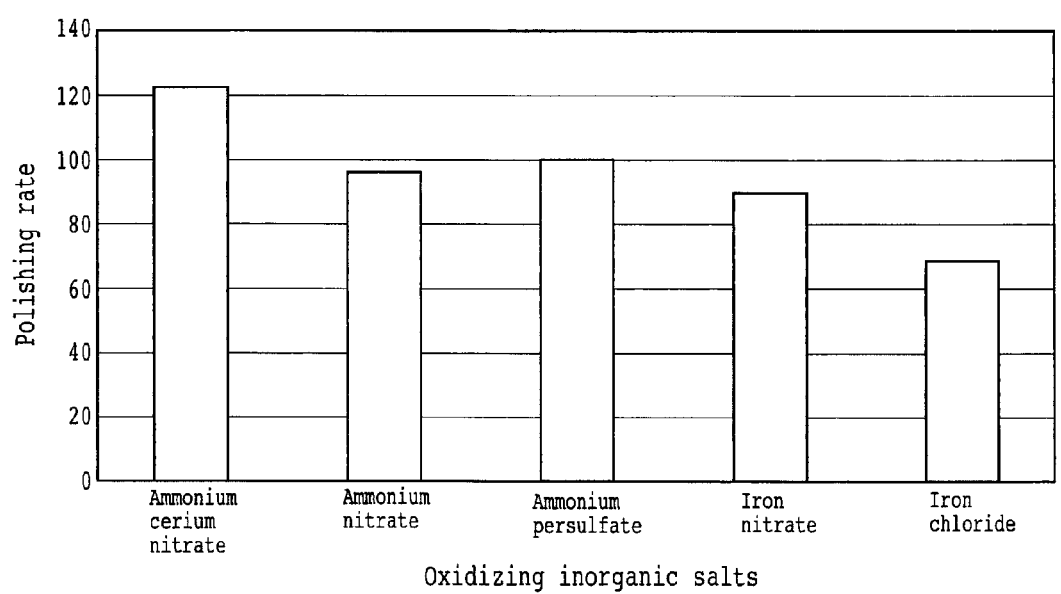
FIG. 2 is a graph showing a relationship between inorganic salts having an oxidizing ability and polishing rate.

Now, an experiment conducted to verify the advantageous effect of the present invention will be described below. In this experiment, the relationships between the contents of the permanganate and the pH adjustor in the polishing liquid (second polishing liquid) used in the second polishing step and the quality of the SiC substrate obtained upon polishing were examined. Specifically, a SiC substrate having undergone the first polishing step was subjected to the second polishing step carried out using polishing liquids differing in the contents of the permanganate and the pH adjustor. It is noted that the first polishing step was conducted using a polishing liquid containing 0.5 wt % of potassium permanganate and 0.2 wt % of inorganic salts having an oxidizing ability. FIG. 2 is a graph showing the relationships between inorganic salts having an oxidizing ability contained in the polishing liquid used in the first polishing step and polishing rate. In each case, a sufficient polishing rate was obtainable.

In the second polishing step, a polishing liquid A prepared by mixing potassium permanganate (permanganate), phosphoric acid (pH adjustor), and water and a polishing liquid B prepared by mixing sodium permanganate (permanganate), phosphoric acid (pH adjustor), and water were used. It was found that good polishing quality can be obtained when the polishing liquid A is prepared by mixing 0.1 wt % to 5.0 wt % of potassium permanganate and 0.01 wt % to 2.0 wt % of phosphoric acid with water, with a molar ratio of potassium permanganate to phosphoric acid being set to within the range from 0.1 to 2.5. Similarly, it was found that good polishing quality can be obtained when the polishing liquid B is prepared by mixing 0.1 wt % to 5.0 wt % of sodium permanganate and 0.01 wt % to 2.0 wt % of phosphoric acid with water, with a molar ratio of sodium permanganate to phosphoric acid being set to within the range from 0.1 to 2.5.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A method of polishing a SiC substrate by supplying a polishing liquid to a polishing pad and bringing the polishing pad into contact with the SiC substrate, the method comprising:
    a first polishing step of polishing the SiC substrate with the polishing pad by use of a first polishing liquid containing a permanganate, inorganic salts having an oxidizing ability, and water; and
    a second polishing step of performing finishing polishing of the SiC substrate with the polishing pad by use of a second polishing liquid containing a permanganate, a pH adjustor, and water after the first polishing step;
    wherein the polishing pad is formed by mixing abrasive grains with polyurethane, and
    wherein the second polishing liquid is prepared by mixing 0.1 wt % to 5.0 wt % of the permanganate and 0.01 wt % to 2.0 wt % of the pH adjustor with water, with a molar ratio of the permanganate to the pH adjustor being set to within the range from 0.1 to 2.5.

2. The method of polishing a SiC substrate according to claim 1, wherein:
    the first polishing step is performed until the SiC substrate has been polished to reach a first preset polishing amount; and
    the second polishing step is performed until the SiC substrate has been polished to reach a second preset polishing amount.

3. The method of polishing a SiC substrate according to claim 1, wherein the permanganate contained in the second polishing liquid is the only inorganic salt included in the second polishing liquid.

4. The method of polishing a SiC substrate according to claim 1, wherein the pH adjustor of the second polishing liquid comprises phosphoric acid.

5. The method of polishing a SiC substrate according to claim 1, wherein:
    the permanganate of the second polishing liquid comprises potassium permanganate; and
    the pH adjustor of the second polishing liquid comprises phosphoric acid.

6. The method of polishing a SiC substrate according to claim 1, wherein:
    during the first polishing step, disorder in a crystal lattice of the SiC substrate is generated due to the use of inorganic salts in the first polishing liquid; and
    during the second polishing step, the combination of the permanganate, the pH adjustor and water of the second polishing liquid suppresses the disorder in the crystal lattice of the SiC substrate.

7. The method of polishing a SiC substrate according to claim 6, wherein:
    the pH adjustor of the second polishing liquid comprises an acid selected from the following: hydrochloric acid, sulfuric acid, nitric acid, and phosphoric acid; and
    the permanganate contained in the second polishing liquid is the only inorganic salt included in the second polishing liquid.

8. The method of polishing a SiC substrate according to claim 1, wherein:
    the first polishing step comprises providing the first polishing liquid to the SiC substrate from a first tank, through a longitudinal hole in the polishing pad, and
    the second polishing step comprises providing the second polishing liquid to the SiC substrate from a second tank, through the piping and the longitudinal hole in the polishing pad.

9. The method of polishing a SiC substrate according to claim 1, wherein the second polishing liquid includes between 2.6 wt % and 5.0 wt % of the permanganate.

10. A method of polishing a SiC substrate by supplying a polishing liquid to a polishing pad and bringing the polishing pad into contact with the SiC substrate, the method comprising:
    a first polishing step of polishing the SiC substrate with the polishing pad by use of a first polishing liquid containing a permanganate, inorganic salts having an oxidizing ability, and water; and
    a second polishing step of performing finishing polishing of the SiC substrate with the polishing pad by use of a second polishing liquid containing a permanganate, a pH adjustor, and water after the first polishing step;
    wherein the polishing pad is formed by mixing abrasive grains with polyurethane, and wherein the second polishing liquid is prepared by mixing 0.1 wt % to 5.0 wt % of the permanganate and 0.01 wt % to 2.0 wt % of the pH adjustor with water, with a molar ratio of the permanganate to the pH adjustor being set to within the range from 0.1 to 2.5, wherein the method uses a polishing apparatus comprising:

a chuck table holding the SiC substrate;

the polishing pad formed by mixing the abrasive grains with the polyurethane;

a first tanks storing the first polishing liquid and a second tank storing the second polishing liquid;

supplying means selectively supplying one of the first polishing liquid and the second polishing liquid stored in the first and second tanks, respectively;

piping connecting the first and second tanks with a longitudinal hole in the polishing pad, wherein the first polishing liquid is supplied in the first polishing step, and wherein the second polishing liquid is supplied in place of the first polishing liquid in the second polishing step, the method further comprises:

a positioning step of positioning the SiC substrate upon the chuck table, wherein the positioning step is performed prior to the first polishing step, wherein the first polishing step comprises providing the first polishing liquid to the SiC substrate from the first tank, through the piping and the longitudinal hole in the polishing pad, while the SiC substrate is seated upon the chuck table, and wherein the second polishing step comprises providing the second polishing liquid to the SiC substrate from the second tank, through the piping and the longitudinal hole in the polishing pad, while the SiC substrate is seated upon the chuck table.

11. The method of polishing a SiC substrate according to claim 10, wherein:

the first polishing step is performed until the SiC substrate has been polished to reach a first preset polishing amount; and the second polishing step is performed until the SiC substrate has been polished to reach a second preset polishing amount.

12. The method of polishing a SiC substrate according to claim 10, wherein the permanganate contained in the second polishing liquid is the only inorganic salt included in the second polishing liquid.

13. The method of polishing a SiC substrate according to claim 10, wherein the pH adjustor of the second polishing liquid comprises phosphoric acid.

14. The method of polishing a SiC substrate according to claim 10, wherein:

the permanganate of the second polishing liquid comprises potassium permanganate; and the pH adjustor of the second polishing liquid comprises phosphoric acid.

15. The method of polishing a SiC substrate according to claim 10, wherein:

during the first polishing step, disorder in a crystal lattice of the SiC substrate is generated due to the use of inorganic salts in the first polishing liquid; and during the second polishing step, the combination of the permanganate, the pH adjustor and water of the second polishing liquid suppresses the disorder in the crystal lattice of the SiC substrate.

16. The method of polishing a SiC substrate according to claim 15, wherein:

the pH adjustor of the second polishing liquid comprises an acid selected from the following: hydrochloric acid, sulfuric acid, nitric acid, and phosphoric acid; and the permanganate contained in the second polishing liquid is the only inorganic salt included in the second polishing liquid.

17. The method of polishing a SiC substrate according to claim 10, wherein the second polishing liquid includes between 2.6 wt % and 5.0 wt % of the permanganate.

* * * * *

UNITED STATES PATENT AND TRADEMARK OFFICE
CERTIFICATE OF CORRECTION

PATENT NO.       : 9,994,739 B2
APPLICATION NO.  : 14/927752
DATED            : June 12, 2018
INVENTOR(S)      : Katsuyoshi Kojima and Takeshi Sato Page 1 of 1

It is certified that error appears in the above-identified patent and that said Letters Patent is hereby corrected as shown below:

In the Claims

Column 7, Line 11, delete "tanks" and insert --tank--

Signed and Sealed this
Fourth Day of December, 2018

Andrei Iancu
*Director of the United States Patent and Trademark Office*